(12) United States Patent
Whalley et al.

(10) Patent No.: US 10,217,279 B2
(45) Date of Patent: Feb. 26, 2019

(54) THREE DIMENSIONAL WELLBORE VISUALIZATION

(71) Applicant: Landmark Graphics Corporation, Houston, TX (US)

(72) Inventors: Andrew Whalley, Calgary (CA); Dan Colvin, Dripping Springs, TX (US); DeWayne Edward Pratt, Littleton, CO (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 0 days.

(21) Appl. No.: 15/025,865

(22) PCT Filed: Oct. 23, 2013

(86) PCT No.: PCT/US2013/066421
§ 371 (c)(1),
(2) Date: Mar. 29, 2016

(87) PCT Pub. No.: WO2015/060846
PCT Pub. Date: Apr. 30, 2015

(65) Prior Publication Data
US 2016/0247316 A1    Aug. 25, 2016

(51) Int. Cl.
*E21B 17/02* (2006.01)
*E21B 41/00* (2006.01)
(Continued)

(52) U.S. Cl.
CPC .............. *G06T 17/05* (2013.01); *E21B 17/02* (2013.01); *E21B 41/00* (2013.01);
(Continued)

(58) Field of Classification Search
CPC ...... E21B 44/00; E21B 47/00; E21B 41/0092; G01V 1/34; G01V 11/002; G01V 1/40;
(Continued)

(56) References Cited

U.S. PATENT DOCUMENTS

| | | | | |
|---|---|---|---|---|
| 2002/0049575 A1* | 4/2002 | Jalali | ................... | E21B 43/00 703/10 |
| 2006/0190178 A1* | 8/2006 | Zamora | ................... | G01V 1/34 702/9 |

(Continued)

FOREIGN PATENT DOCUMENTS

| | | |
|---|---|---|
| EP | 2065557 A1 | 6/2009 |
| GB | 2352036 A | 1/2001 |

(Continued)

OTHER PUBLICATIONS

International Search Report and Written Opinion, dated Jul. 17, 2014, 13 pages, Korean Intellectual Property Office.

(Continued)

*Primary Examiner* — Haixia Du (57) ABSTRACT

A system and method for displaying a wellbore. A well profile is generated in a computing system. The wellbore is associated with the well profile. Information associated with the wellbore is received including at least components. The wellbore is displayed in three dimensions for review by one or more users.

20 Claims, 9 Drawing Sheets

(51) Int. Cl.
*E21B 47/00* (2012.01)
*G06T 17/05* (2011.01)
*G06T 19/00* (2011.01)

(52) U.S. Cl.
CPC .......... *E21B 47/0002* (2013.01); *G06T 19/00* (2013.01); *G06T 2200/04* (2013.01); *G06T 2200/08* (2013.01); *G06T 2215/16* (2013.01); *G06T 2219/2012* (2013.01)

(58) Field of Classification Search
CPC ... G01V 3/18; G01V 1/50; G01V 3/38; G01V 1/345; G01V 2210/74; G01V 99/005; G06F 2217/16; G06F 17/5009; G06T 17/20; G06T 11/206; G06T 17/05; G06T 2215/01
See application file for complete search history.

(56) References Cited

U.S. PATENT DOCUMENTS

| | | |
|---|---|---|
| 2006/0293872 A1 | 12/2006 | Zamora et al. |
| 2010/0122847 A1 | 5/2010 | Xia et al. |
| 2013/0035863 A1* | 2/2013 | Selman .................. E21B 43/26 702/9 |
| 2013/0035919 A1* | 2/2013 | Al-Shammari ..... G06F 17/5009 703/10 |
| 2013/0201787 A1* | 8/2013 | Vermilye ................ G01V 1/42 367/9 |

FOREIGN PATENT DOCUMENTS

| | | |
|---|---|---|
| GB | 2400468 A | 10/2004 |
| JP | 2008234005 A | 10/2008 |

OTHER PUBLICATIONS

United Kingdom Intellectual Property Office, Application No. GB1605443.9, Examination Report, dated Aug. 10, 2017, 3 pages, United Kingdom.

Canadian Intellectual Property Office, Examiner's Letter, Mar. 1, 2017, 6 pages, Canada.

\* cited by examiner

THREE DIMENSIONAL WELLBORE VISUALIZATION

CROSS-REFERENCE TO RELATED APPLICATIONS

This application is a U.S. national stage patent application of International Patent Application No. PCT/US2013/066421, filed on Oct. 23, 2013, the benefit of which is claimed and the disclosure of which is incorporated herein by reference in its entirety.

BACKGROUND OF THE INVENTION

Over the last few years the development of new data acquisition technology has encouraged the petroleum industry to move to areas of high geological complexity. Simultaneously, advanced drilling technology has enabled commercial exploitation of the hydrocarbon reserves in such areas. In mature areas, there is increased pressure to increase the recovery factor. In some cases, mapping and tracking the wellbore size, shape, and direction as well as corresponding well bore and downhole components may be increasingly difficult.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

The illustrative embodiments provide a system, method, and computer program product for generating three dimensional wellbore visualizations. The various components, properties, characteristics, and configurations of a wellbore including downhole components may be entered, graphically represented, recorded, stored, and saved for subsequent rendering to a user in a three dimensional format. The three dimensional wellbore may be displayed with a three dimension view of downhole components as well as subsurface geology and earth models. In one embodiment, the wellbore may be visualized to enable engineers, professionals, and other parties to determine the limitations, potentials, issues, and features of the wellbore for maximizing output and resolving any number of issues.

The data and information associated with the wellbore may be saved in one or more databases. In one embodiment, the databases may be securely stored for access by authorized users or companies. For example, any number of encryption, username, password, and so forth may be utilized to secure the data. Wellbore profiles may be created and centrally stored for any number of companies. In one embodiment, the wellbore profiles may specify all of the information utilized to find, generate, maintain, inactivate, or otherwise operate the well. However, only companies and individual users with authorized access may retrieve the information to maintain privacy and proprietary information specific to each wellbore. As a result, entry of and management of accurate wellbore information may be obtained to maximize output results and other wellbore focused activities.

The wellbore may be visualized in any number of ways. In one embodiment, the three dimensional wellbore may be rendered nearly instantaneously. The wellbore may be visualized in a three dimensional graphic that may be rotated, panned, zoomed, exploded, or otherwise navigated by the user. The user may also select to view the wellbore in two dimensions.

The illustrative embodiments may allow one or more users to model, measure, and optimize strategies for one or more wellbores. The users may be able to perform end-to-end reservoir simulation to determine the effectiveness or non-effectiveness of various wellbore configurations, components, and so forth. The illustrative embodiments may allow the visualization and analysis of collected data in combination with geological, geophysical, petrophysical, and engineering data, including wellbore completion date. The illustrative embodiments may be configured to interact with any number of other computing and database systems, such as Engineers Desktop, Engineers Data Model (EDM) Open Wells, OpenWorks® from Landmark Graphics Corporation, Data Analyzer, Engineers Data Model, and other Similar Platforms. In one embodiment, the illustrative embodiments may be implemented within or communicate with any of the described systems or databases.

The data may include initial prototypes, plans, and as completed designs and drilling bottom hole assemblies (BHAs) that are associated with each of the wellbore profiles. For example, all of this information may be presented as a simplified representation of the stratigraphic column saved or presented based on a user request. The visualization and analysis may be utilized for holistic evaluation and optimization of future stimulation planning.

In one embodiment, the well profile and the associated wellbore information may be entered manually by a user. In another embodiment, all or portions of the well profile and the wellbore information may be automatically generated utilizing data retrieved or accessed from one or more programs or sources. For example, any number of applicable programs may be access to determine information relevant to the wellbore (i.e. well log) along with associated component information retrieved from an inventory database.

Figure 1:
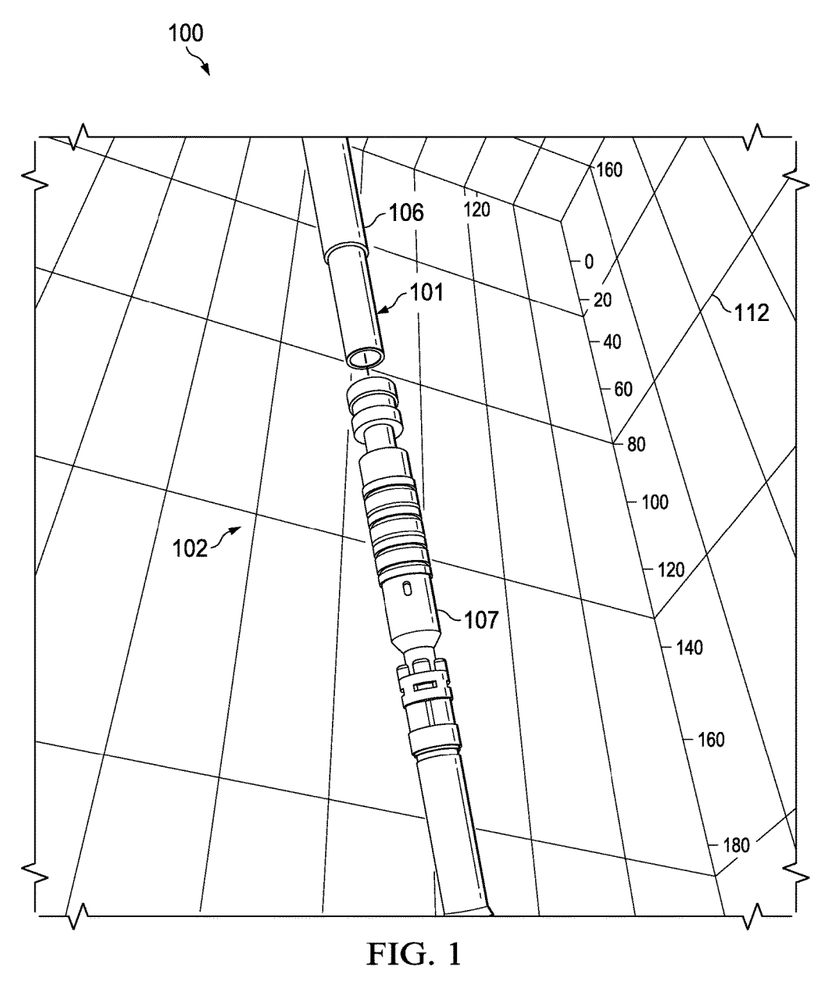
FIG. 1 is a schematic, pictorial representation of a three dimensional wellbore in accordance with an illustrative embodiment.
Figure 2:
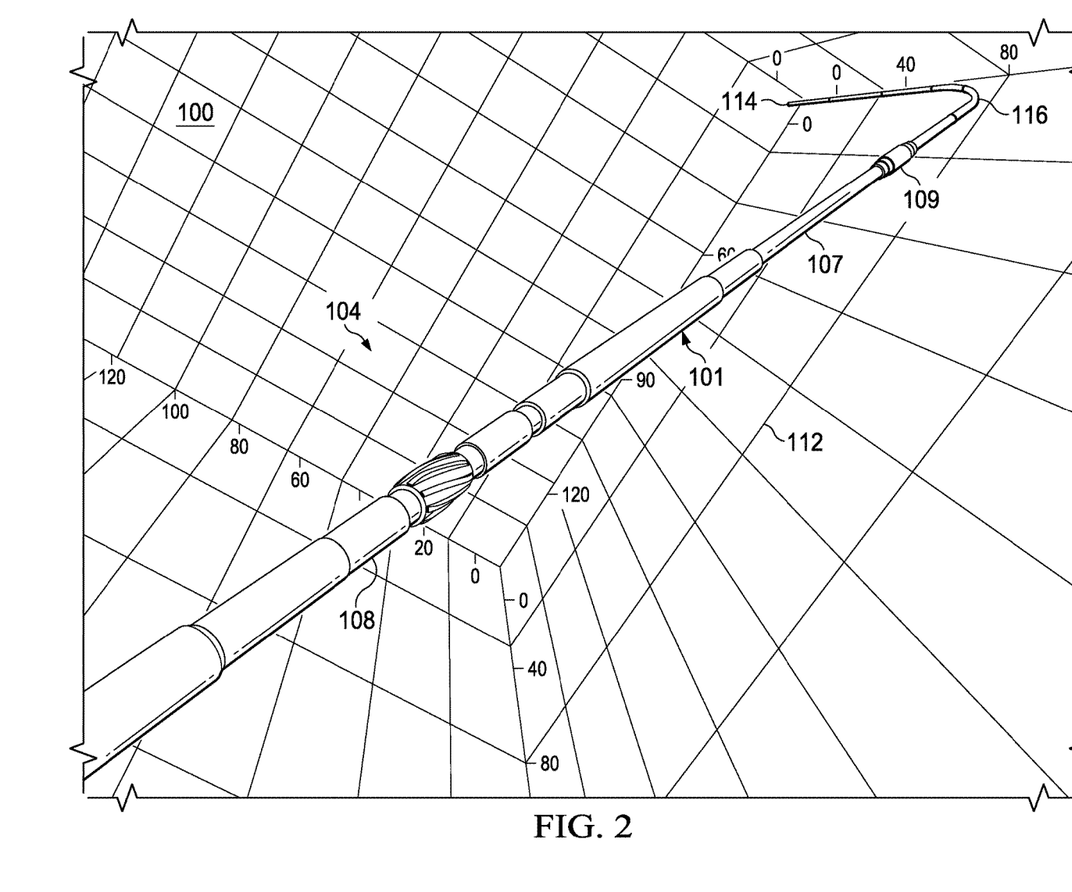
FIG. 2 is a schematic, pictorial representation of a three dimensional wellbore in accordance with an illustrative embodiment.

Turning now to FIGS. 1 and 2 showing views 102 and 104 of a three dimensional wellbore 100 in accordance with illustrative embodiments. The subsequent description relates to the three dimensional wellbore 100 as well as the system, devices, equipment, algorithms, and code that may be utilized to implement the three dimensional wellbore 100. In one embodiment, the three dimensional wellbore 100 may be displayed in response to a user request for a specific wellbore 101 or well profile. For example, the wellbore 101 may be selected based on an identifier, map, or other associated information. The user may represent any number of engineers, geologists, oil field workers, specialists, or professionals. The value of the information provided through the illustrative embodiments does not require a particular professional or experience skill set to provide benefits and relevant information.

In one embodiment, the three dimensional wellbore 100 may display casings 106 and 107, components 107, 108, 109, depth 110, gridlines 112 and entry point 114. In one embodiment, the three dimensional wellbore 100 may be displayed utilizing gridlines or markers to provide a sense of distance, scale, depth, and size. The gridlines may be useful in determining the depth of turns, components, or other relevant details for analysis by the user. The three dimensional wellbore 100 may also be described in terms of a system that renders the three dimensional wellbore 100, such as a computing or communications device (See FIG. 4 for one potential embodiment of all or portions of a system).

View 102 illustrates a zoomed view of a portion of the wellbore 101. For example, view 102 may focus on the casing 106 and the component 107. In view 102, the component 107 (i.e. stretchable packer) is shown as separated from the casing 106 even though the two are connected in actuality. The view 102 may simply help a user further understand the connections and complexities of the wellbore. For example, the user may have selected a disconnected view for the three dimensional wellbore 100.

View 104 may be a zoomed out view of the wellbore 101 and may show a more three dimensional view of the wellbore 101 including a curve 116 displayed after the entry point 114 and component 109. The view 104 may provide additional perspective for evaluating the different portions of the wellbore 101. In the view 104, the component 107 may be swapped out with component 108 (i.e. integral blade stabilizer) for better accuracy or to better evaluate the potential of the wellbore 101 or processes.

The three dimensional wellbore 100 may display all types of wells (e.g. oil, gas, water injection, stream injection, etc.), all well geometries (e.g. vertical, deviated, horizontal, sidetracked, multi-lateral), and well status (producing, suspended, abandoned, etc.). For example, a legend displayed as part of a window or index may display relevant text information applicable to the three dimensional wellbore 100 to facilitate review and analysis of the wellbore 101. From the view 104 of the three dimensional wellbore 100, the user may be able to select to display predicting and measured reservoir fluid contacts, such as oil water contact, gas oil contact, and gas water contact.

The user may be able to see different aspects of the wellbore 101 and the corresponding deviations, such as between prototype, planned, and actual completion. For example, differences between the deviations may be overlaid or displayed adjacent one another for the user to analyze. The user may be able to select to display specialized completion components, such as downhole mechanical and electrical pumps, control lines, and umbilicals. The user may also be able to display representations of operational data in addition to the completion data (e.g. Stimulations, Drill Stem Tests (DSTs), Test, Cores, Sidewalls, Cores, Logs, Gravel Pack, Pressure Survey, Repeat Formation Tester (RFT), Wellbore Openings and Obstructions, etc.). These representations of components and operational data may be presented at the relevant depth along the wellbore 101. The wellbore 101 may be shown to scale or adjusted to facilitate viewing key aspects or components of the wellbore 101.

The three dimensional wellbore 100 may also store or access details of the completion string components, including component identification, dimensions, manufacturer and depth for all time periods from initial drilling to abandonment. The three dimensional wellbore 100 may also display or text, data, or other information associated with the wellbore 101, components, functionality, or so forth. In one embodiment, when a particular component is selected, any number of mouse over windows, pop-ups, audio description, or other information may be displayed in a number of different formats for the user to review. The user may be able to select text details of a completed component including information, such as identification, dimensions, manufacturer, installation date, installing party, lifespan, installing party, depth, and so forth. The three dimensional wellbore 100 may also display a depth track associated with a selected area, component, or so forth of the wellbore. The depth indicator may be toggled on or off based on selection of an icon, graphic, drop-down menu, or other selection component.

The three dimensional wellbore 100 may indicate the status of the wellbore, such as opened, closed, or position of choke. The three dimensional wellbore 100 may also display or indicate the presence or associated information for downhole components, such as sliding sleeves, perforated intervals, casings, internal tubing string, packers, completion jewelry, downhole valves and chokes, perforations, injection ports, tubing plugs, casing or bridge plugs, cement and send plugs, and so forth for all time periods from initial drilling to abandonment. For example, a user may be able to select to display graphically or on demand, the details of the perforation, such as interval, status, phasing, density, charge size, orientation, and so forth to view, understand, and determine the perforation strategy employed in the wellbore 101.

In one embodiment, the three dimensional wellbore 100 may allow the user to select a transparency level of the various components in the completed wellbore to better view components that are inside or behind other components. For example, the transparency of the casing may be set to translucent to allow the user to view the tubing in the three dimensional wellbore 100. In addition, any number of visual techniques, such as different colors, line types, line breaks, designs, or so forth may be utilized. The user may also be able to selectively zoom into a specific location in the completed wellbore 101. Since the relative scales of the three dimensional wellbore 101 may be vastly different, this may allow a user to view the particular point or component in the completed wellbore rather than manually panning and zooming to find the required location. In addition, the three dimensional wellbore 100 may be maximized for viewing utilizing a touchscreen including any number of shortcut keys for panning, zooming, adjusting transparency, selecting distinct views, navigating the wellbore (e.g. performing a fly through, linear wellbore examination, etc.), or so forth.

In one embodiment, the user may not only view the three dimensional wellbore 100, but may also edit or add to the three dimensional wellbore 100 by changing placements, adding or editing components, changing features, characteristics, or properties, adding text or other description, or otherwise reconfiguring the three dimensional wellbore 100. For example, the user may invoke an editor function to revise the visual, text, and data layout of the wellbore 101. The editor may also be utilized to make modifications at any time.

The three dimensional wellbore 100 may be configured to interact with other visualization systems or software to import, export, or display relevant information (e.g. engineering and geological databases and applications). For example, an inventory database, spreadsheet, or other information associated with the wellbore 101 may be utilized to enter relevant information for generating and displaying the three dimensional wellbore 100. As a result, the one or more users may not be required to manually enter details of the completion record associated with the wellbore 101. The three dimensional wellbore 100 may also be generated from information in a number of different formats. For example, paper documents may be entered as details of the wellbore 101 utilizing optical character recognition or recognition of relevant symbols and components.

The user may also assemble information including a completion diagram, perforation records, open hole logs, cement evaluation logs, printouts from stimulation monitoring services, and pre- and post-production history. The three dimensional wellbore 100 may allow a user to select and display distinct wellbore log profiles. The three dimensional wellbore 100 may also include logs, curves, and wellbore images that are entered or derived from any number of evaluation tools (e.g. CAST, classic cement bond log (CBL), etc.). The three dimensional wellbore 100 may also display the thickness of the cement she over the interval being stimulated. For example, the thickness may be based on the difference between the caliper log an outer dimension of the casing run across a particular interval. The user may also be able to separately select to display a representation of the borehole based on a caliper log or a borehole imaging or measurement tool.

The three dimensional wellbore 100 may also display the expected flow path of the stimulation fluids based on the treatment operations, the completion present at the time of stimulation, the presence of plugs at the time of stimulation (e.g. downhole plugs, including tubing plugs, casing or bridge plugs, cement and fan plugs, etc.), the status (i.e. opened or closed) of configurable items (e.g. sliding sleeves, downhole valves, injection ports and chokes), and the position and status of the perforations. The user may toggle on or off the representation of the expected flow path of the stimulation fluids within the three dimensional wellbore 100.

In one embodiment, the user may play back the stimulation activities and resulting microseismic events or surveys at any time as selected by the user.

For example, the three dimensional wellbore 100 may incorporate micro-seismic events in relation to a well geometry in either two-dimensional or three dimensional space. For example, the three dimensional wellbore 100 may display the results of a fracturing procedure performed on the wellbore.

The illustrative embodiments are also configured to represent the completion data that is appropriate to the level of zoom of the three dimensional wellbore 100. In one embodiment, the three dimensional wellbore 100 may include a number of versions or timestamps to view the completed wellbore 101 as it existed at a particular point in time to see how the completed wellbore 101 has changed over the life of the well or during stimulation. In addition, distinct versions of each modification may be saved for subsequent retrieval or review to determine what worked or didn't work with the wellbore 101.

As is subsequently described, the user may utilize any number of computing or communications devices to display the relevant information. The processing, data retrieval, and rendering may be performed on the device access by the user or may be streamed to the device of the user through one or more network connections. For example, data processing may be performed by a server farm that is accessible to a user through a number of wireless networks, and physical connections to the server farm. As a result, the three dimensional wellbore 100 may be displayed in an office environment, at a client location, in the field, or in any other environment in which the wellbore needs to be evaluated or visualized.

The three dimensional wellbore 100 may represent initial modeling, well site operational management and logistics, or a final or intermediary evaluation report. The three dimensional wellbore 100 may provide static or dynamic images and renderings that may show a variety of information. In one embodiment, the three dimensional wellbore 100 may simulate fluid flow and other properties of the wellbore 101.

The illustrative embodiments may be utilized to provide any number of benefits to users including: stabilizing or decreasing finding and development costs through lowering production decline in increased book reserves; lack of knowledge of injection distributions during stimulation job and fractured geometry uncertainty; during stimulation job to fit the reservoir or specific area of the reservoir; variable production predictability; and stimulation and completion information not integrated with geological interpretations. In addition, providing integrated solutions and displayable information provides cost and efficiency benefits. The inclusion and utilization of completion data by the illustrative embodiments may be particularly useful for users, companies, and other parties.

The user may utilize the three dimensional wellbore 100 to establish and update geologic frameworks for the wellbore 101, confirm and/or refine geological interpretations, including rock properties (e.g. lithology, porosity, permeability, etc.), structure, seismic interpretation, and so forth. In some instances, the engineering data related to drilling, wellbore configuration and well completion exist in a separate world from the geological interpretation and geological representation of the well and the field. Separation of data and systems may cause problems that are addressed by the illustrative embodiments including well placement, completion design, stimulation planning and evaluation, and production evaluation. Other areas of subsurface focus or investigation may include, but are not limited to: positive or negative drilling formations, faults, abnormal pressure zones, salt domes, subsurface hazards, historic drilling data, and so forth.

The user may also be able to perform any number of requests or queries of wellbores entered within the system. For example, the user may be able to identify all wells or intervals that match combinations of common criteria that might affect the stimulation results (e.g. same perforation strategy, same completion component, range of perforated interval, etc.). For example, the user may run a search to identify at all wells or intervals that match a single common criteria that might affect the recovery or initial production (e.g. range of production response, same perforation strategy, same completion component, range of perforated interval and area of the field, etc.). These criteria may be generated by the user or automatically identified based on problems noted with existing wells. For example, any number of alerts or alarms may be created based on problems that are automatically or manually detected or entered that are similar across other wells.

In one embodiment, the system processing and displaying the three dimensional wellbore 100 may also display one or more windows displaying information or details relevant to the wellbore 101, such as a location on a map, section or cube view of the wells or intervals, or so forth. The three dimensional wellbore 100 may also display production related data such as production rates, production splits, cumulative production, and pressure regime at either the wellbore interval level. The user may be able to select and display one or more production log traces (e.g. spinner, temperature, holdup, inferred production, etc.).

In one embodiment, the user may be able to create a video representation of the completion and operational events associated with the wellbore 101 together with the geology, such as from initial drilling to abandonment. The user may be able to select a fixed position, angle and level of zoom, and so forth for viewing the video. The downhole tools and components shown in the three dimensional wellbore 100 may be associated with any number of manufacturers, installation dates, installation parties, companies, graphical representations, or so forth. In one embodiment, any number of parties may create a graphical representation of their tool that is accurate and available as part of one or more electronic libraries provided by that company. As a result, wellbore drawings may be created from distinct libraries utilizing preset identifiers, drag-and-drop techniques, or any number of other methods for performing graphical retrieval and representation.

In one embodiment, the three dimensional wellbore 100 may be compiled from information provided by one or more engineers and geologists utilizing open hole logs and geological models. For example, these users may be able to work together to explore and refine the proposed completion design for a new deep water single well tieback. The stratigraphy may be complex and include a series of interbedded sands of varying quality, pressure regimes, and lateral extent. The three dimensional wellbore 100 may then be utilized to perform intelligent completion by evaluating the appropriate completion placement of specific components, design, and perforation strategy.

In one embodiment, a number of users may modify or edit the three dimensional wellbore 100 concurrently. For example, updates and modifications may be saved to a central file. Any discrepancies between the information entered by distinct users may be flagged for verification or correction in the central file. Any number of conflicted copies may also be created as needed for distinct users. In one embodiment, the three dimensional wellbore 100 may include a number of users that have specified permissions or so forth for editing, updating, or deleting the three dimensional wellbore 100. In addition, iterative changes may be saved to return to a previous point in the generation or modification process. This may be particularly relevant if information is incorrectly or inadvertently entered that is then associated with the three dimensional wellbore 100.

In one embodiment, the three dimensional wellbore 100 may include an auto completion component for filling in the gaps between specific completion components based on standard practices, default information, or so forth. The user may also be able to specify the size, grade, and service of the tubing or other component. The system may also note issues that are detected that may be determined to be inaccurate or impossible (i.e. component is too big to fit within a specified casing or liner). The three dimensional wellbore 100 may also display detailed list of individual completion string components, such as identifications, dimensions, manufacturers, and depths. For example, reports or lists of completion components may include at a minimum description, length, depth, OD, ID, and grade may be generated. The three dimensional wellbore 100 may be available to any number of stress checking applications, verification tools, or so forth.

Figure 3:
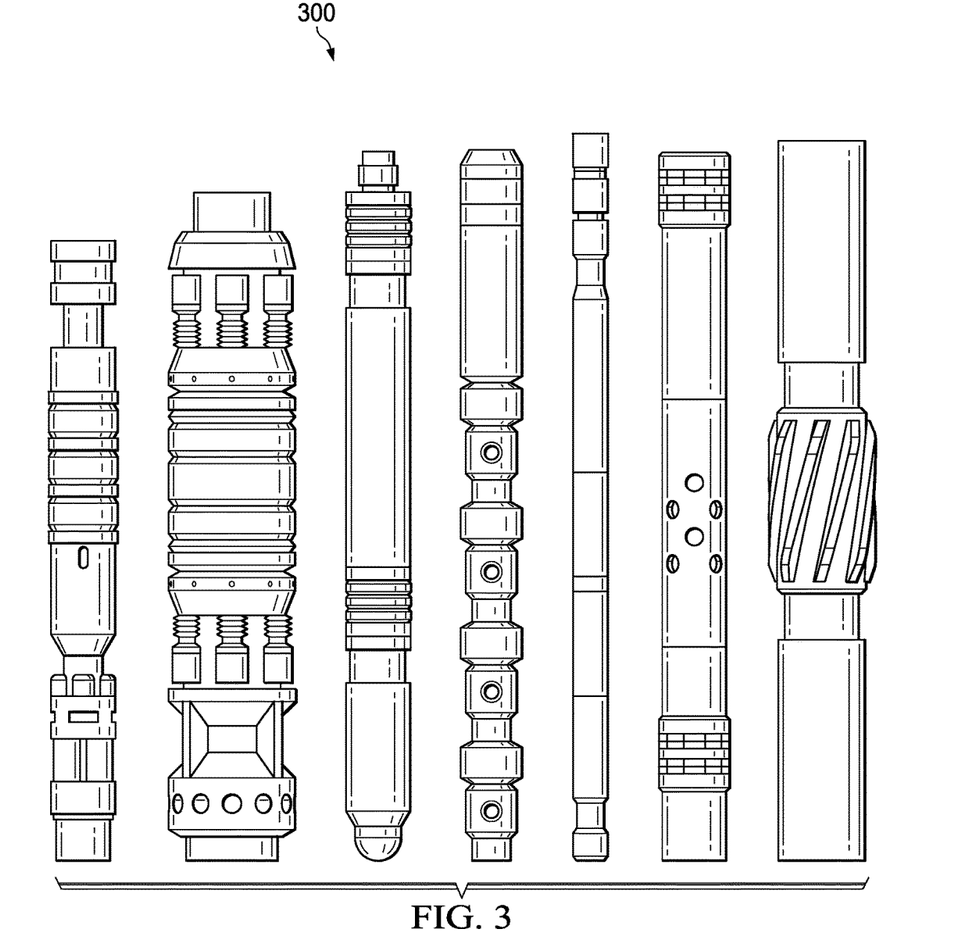
FIG. 3 is a schematic, side view of wellbore components in accordance with an illustrative embodiment.

FIG. 3 is a schematic, side view of wellbore components 300 in accordance with an illustrative embodiment. In one embodiment, the wellbore components 300 may be available through one or more libraries. The libraries may be utilized to customize the three dimensional wellbore as generated, saved and rendered for the user. For example, the wellbore components 300 may be shared with the user as a library, object, or code in response to the user purchasing one of the components. In another embodiment, the manufacture of each of the wellbore components 300 may make the corresponding image, file, or library available to all parties as a form of marketing and to encourage purchasing those individual components.

In one embodiment, the wellbore components 300 may be available for a user to drag-and-drop into a three dimensional wellbore as portions of the well are completed or after the fact. In another embodiment, each of the wellbore components 300 may have an identifier. The illustrative embodiments may utilize the identifier and corresponding installation information, such as depth and connection components, to automatically insert one or more of the wellbore components 300 in the correct orientation and position within the wellbore. The wellbore components 300 show (from left to right) a hydraulic packer, a squeeze packer, a side pocket mandrel, a bull nosed perforating gun, a hydraulic accelerator, a gas lift mandrel, and a key-seat wiper.

Figure 4:
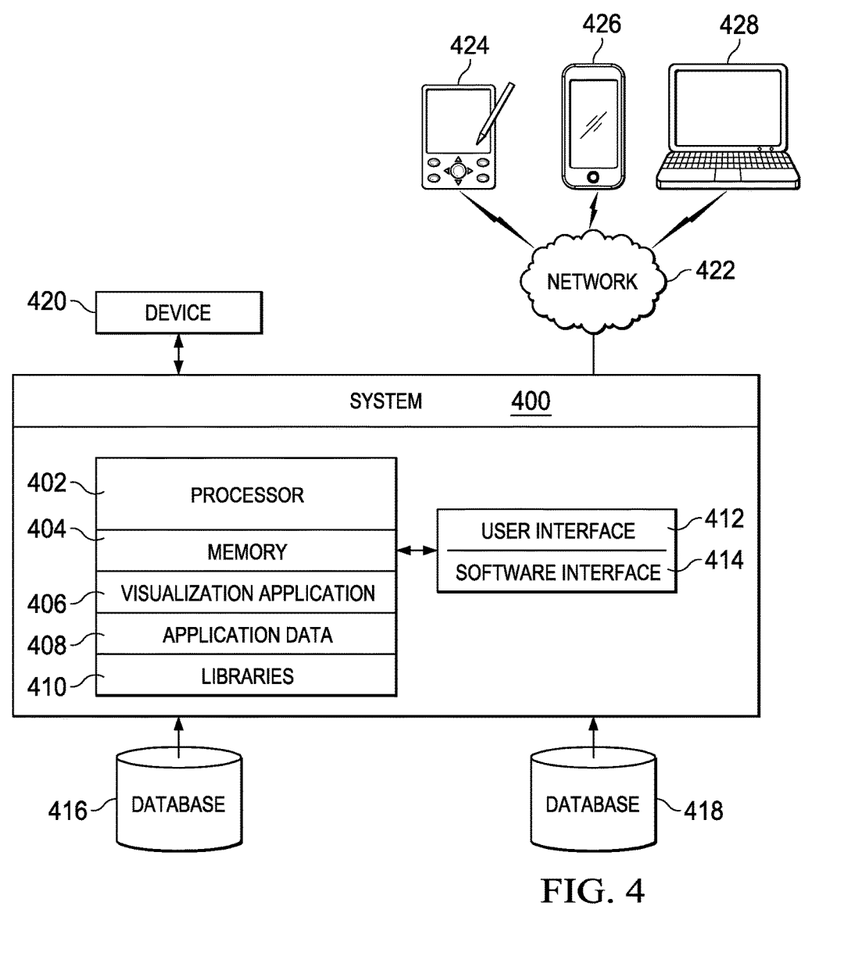
FIG. 4 is a block diagram of a system for three dimensional wellbore visualization in accordance with an illustrative embodiment.

FIG. 4 is a block diagram of a system 400 for three dimensional wellbore visualization in accordance with an illustrative embodiment. In one embodiment, the system may include a processor 402, a memory 404, a visualization application 406, application data 408, libraries 410, client interface 412, and software interface 414. The system may further communicate with databases 416 and 418, device 420, network 422, and devices 424, 426, and 428.

The system 400 is one embodiment of a device, networked computing system, or computing or communications environment that may be utilized to create, manage, save, access, and display borehole profiles utilized to display three dimensional boreholes. In one embodiment, the system 400 is a personal computing device, such as desktop computer configured to communicate with one or more devices, such as the devices 420 and 424-428 to manage borehole profiles.

In another embodiment, the system 400 may be a server, terminal, mainframe, or other network device that acts as a master tool for saving borehole profiles and rendering three dimensional wellbores. In one embodiment, the system 400 may perform all of the processing and only the results may be communicated to one or more of the devices 420 and 424-428 based on user input. The system 400 may include any number of computing or communications components not specifically described herein including, but not limited to, motherboards, busses, ports, cards, interfaces, transceivers, interfaces, adapters, peripherals, displays, jacks, processors, memories, operating systems, applications, modules or similar hardware or software components. The system 100 or devices 420 and 424-428 may also include any number of peripherals, such as a mouse, keyboard, displays, microphones, headphones, heads up displays, smart glass, or so forth. The system 400 may include oilfield, geological, engineering, exploration, database, or accounting hardware, software, equipment and interfaces in addition to the described components.

For example, the visualization application 406 may interface with any number of applicable programs or database systems, such as Engineers Data Model, OpenWorks® from Landmark Graphics Corporation, and so forth through the software interface 414. The software interface 414 may perform formatting, processing, or various algorithms to integrate the features, functionality, and data of the visualization application 406 with one or more other programs. In one embodiment, the visualization application 406 may represent a master application and one or more subservient or secondary visualization applications may be installed or programs or "apps" 420 and 424-428. As a result, user input, data retrieval and management, and communications may occur through the visualization applications.

The processor 402 is circuitry or logic enabled to control execution of a set of instructions. The processor may be microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor may be a single chip or integrated with other computing or communications components of the system 400.

The memory 404 is a hardware element, device, or recording media configured to store data for subsequent retrieval or access at a later time. The memory may be static or dynamic memory. The memory may include a hard disk, random access memory, cache, removable media drive, mass storage, or configuration suitable as storage for data, instructions, and information. In one embodiment, the memory and processor may be integrated. The memory may use any type of volatile or non-volatile storage techniques and mediums. The memory 404 may include any number of databases in addition to those shown.

The visualization application 406 is the instructions, code, or logic (hardware or software) configured to render three dimensional wellbores. The visualization application 406 may be stored in the memory 404 executed by the processor 402 to perform the illustrative embodiments as herein described. The visualization application 406 may be operable to operate automatically or autonomously with or without user input in multiple instances and with multiple display outputs (i.e., screens, views, windows, etc.). In another embodiment, the visualization application 406 may require user interactions to render one or more three dimensional wellbores.

The visualization application 406 may be configured to store a number of well profiles each of which may be associated with a number of wellbores. The visualization application 406 may be configured to display a representation of the wellbore and its downhole components in a three-dimensional view as it relates to subsurface geology and earth models. The visualization application 406 may graphically display both the wellbore profile (e.g. casings, tubing, open hole, etc.) and downhole tools (bottom hole assembly, pipe, etc.) within a three-dimensional view as it relates to the subsurface. The visualization application 406 may allow a user to travel down the wellbore any third person perspective (fly through) to visualize the wellbore in context of the subsurface. To visualize a depiction of the well bore and downhole tools in a three-dimensional view, the visualization application 406 may access the libraries 410 to include components or items, such as casings, tubings, packers, cement, perforations, bottom hole assembly components, drill pipe, heavyweight pipe, stabilizers, crossovers, collars, centralizes, shoes, pumps, logging tools, measure while drilling tools, bits, whole openers, and so forth as are herein described and as are utilized in the industry.

The application data 408 represents the information and data utilized to render the three dimensional wellbore. The application data 408 may represent a module or memory component accessed by the visualization application 406 to render a wellbore based on the selection of a well profile. In one embodiment, the application data 408 may communicate with one or more of the databases 416 and 418 to retrieve relevant information and data. In one embodiment, a plurality of parties including users, companies, contractors, and so forth may work on a well. In one embodiment, each time an update, service, or activity is performed on the wellbore, the activity is logged and communicated to the system 400 or the databases 416 and 418. As a result, the most up-to-date information associated with each of the wellbores is always available.

The application data 408 may also be stored in the databases 416 and 418. In one embodiment, multiple databases 416 and 418 may be utilized to ensure a redundant backup in the event of an emergency or outage. In one embodiment, the wellbore data stored in the application data 408 may be referred to as a wellbore schematic. The visualization application 406 may utilize the application data fall it to generate the three dimensional wellbore in the context of the subsurface Earth model. The databases 416 and 418 may also represent databases or applications, such as Engineers Data Model and Open Works. The application data 408 is secured to protect proprietary information and processes utilized by all parties associated with the wellbore while still performing the most recent updates to the wellbore information.

The user interface 412 is an input/output system for interacting with the user audibly, visually, and/or tactilely. The user interface 412 may include a keyboard, monitor, mouse, voice control system, touch pad, track ball, or other systems or devices for interacting with a user. The user interface 412 may be integrated with the system 400 or part of a separate system, device, or equipment in communication with the system 400. For example, the user interface may display a graphical user interface that provides a visual interface for interacting with the user and displaying the associated wellbore images, video, files, data, text, and other information. For example, views of the graphical user interface are illustrated in FIGS. 1 and 2. The graphical user interface may display information regarding the selected wellbore, engineering data, completion data, verification data, reports, updates, and other related information.

The user interface 412 may allow a user to control the view, text, data, and content associated with the wellbore. For example, the user may display the wellbore using a configurable scale. This scale may be adjusted to stand out in a greater width than the wellbore itself. The user interface 412 may also include a list of all equipment, components, and elements of the wellbore for selection by the user. By selecting a component, the user interface may command the visualization application 406 to jump to the specific item for display to the user. As a result, a user may easily jump to problem areas within the wellbore.

The network 422 is a network operable to communicate data, packets, voice signals, and other electronic communications between the system 400 and the devices 424-428. The network 422 may represent any number of public or private networks, such as the Internet, as well as any number of wired or wireless networks. In one embodiment, the network 422 is an Ethernet network. The network 422 may also represent any number of wireless networks communicating through wireless signals or connections, such as GSM, WiFi, WiMAX, 3G, 4G, LTE, satellite, and so forth. The network 420 may also be utilized to communicate with distinct users, companies, manufacturers, websites, contractors, service providers, and other users, systems, or parties to communicate wellbore profiles, problems, libraries, scripts, maps, and other electronic communications or resources utilized by the system 400.

As shown, the system 400 may be configured to interface directly with the user. In another embodiment, the system 400 may communicate with the devices 420 and 424-428 directly or indirectly through one or more networks, such as the network 422. For example, the device 420 may connect directly through a Wi-Fi, Bluetooth, or other proprietary connection. Similarly, the devices 424-428 may communicate through the network 422.

The libraries 410 include the electronic information, models, data, scripts, logic, processor, and programs for rendering the distinct portions of the three dimensional wellbore. The libraries 410 may include open source or proprietary information and databases. The libraries 410 may store information for any number of wellbore characteristics, properties, structural elements, mechanical components, models and configurations. In one embodiment, the libraries 410 may include information designating an image and associated data for a number of components. The various manufacturers, service providers or others may provide scripts, programs, or modules configured to properly render the wellbore and components. Likewise, the libraries 410 may store and update firmware, operating systems, applications, and other versions of the components is more updated information becomes available.

Figure 5:
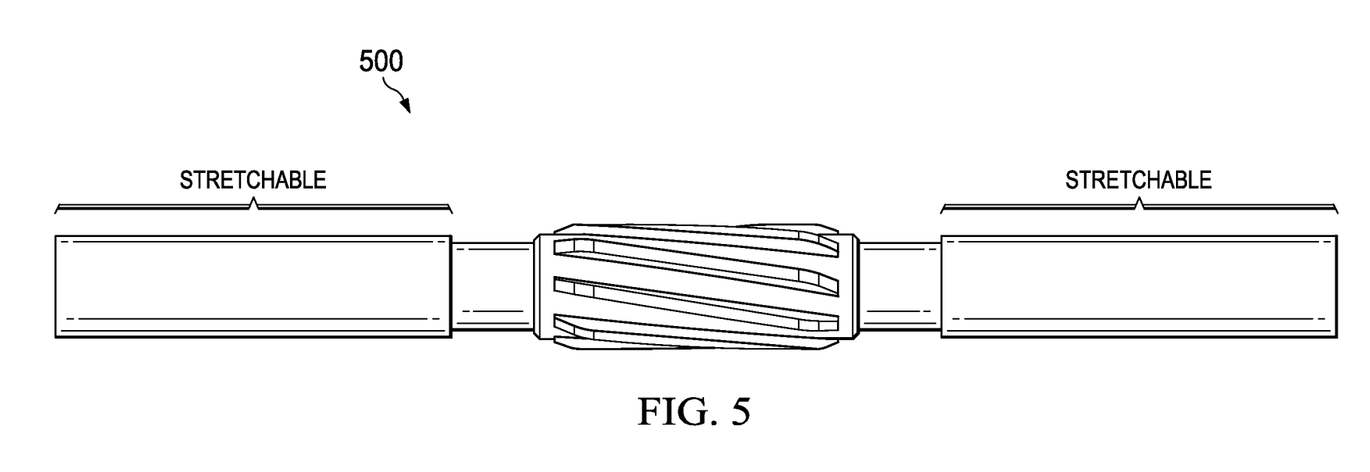
FIG. 5 is a schematic, side view of a wellbore component in accordance with an illustrative embodiment.

FIG. 5 is a schematic, side view of a wellbore component 500 in accordance with an illustrative embodiment. The wellbore component 500 may be configured to represent customization or utilization within the wellbore. For example, some wellbore components are customizable or reconfigurable based on the needs of the company, conditions of the wellbore or environmental factors. For example, the wellbore component 500 may be configured to be stretched to span a space or gap within the wellbore. The wellbore component 500 may be reconfigured utilizing corresponding settings (e.g. distances specified in English or metric units) or may be adjusted utilizing dragging or expansion techniques (e.g. expansion using fingers on a touch screen, dragging corners of the component 500, etc.). In one embodiment, the wellbore component 500 is constrained by the physical size and movement of the actual component during utilization.

For example, the wellbore component 500 that is represented by the symbol shown in FIG. 5 may be a generic version of a particular component designed to be a certain length and diameter. The data that comes from the database may describe the actual component to be drawn and may have a different length and diameter from that of the symbol utilized. In such cases, the symbol may be scaled to fit the requested parameters. For example, the wellbore component 500 may be designated as being stretchable to achieve a desired length without having to stretch or compress the main features of the wellbore component 500.

Figure 6:
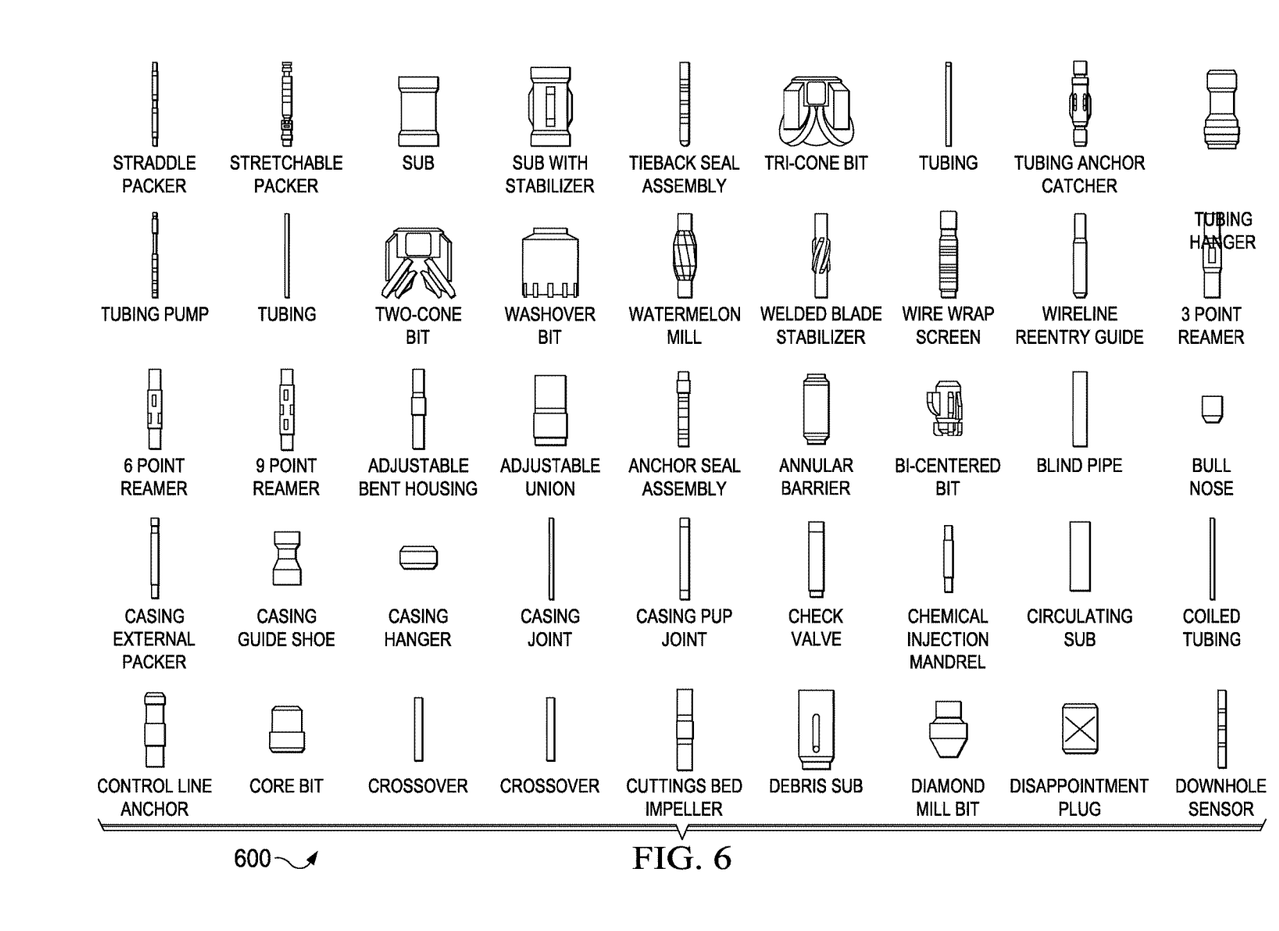
FIG. 6-8 are schematic, side view of wellbore components in accordance with an illustrative embodiment.
Figure 7:
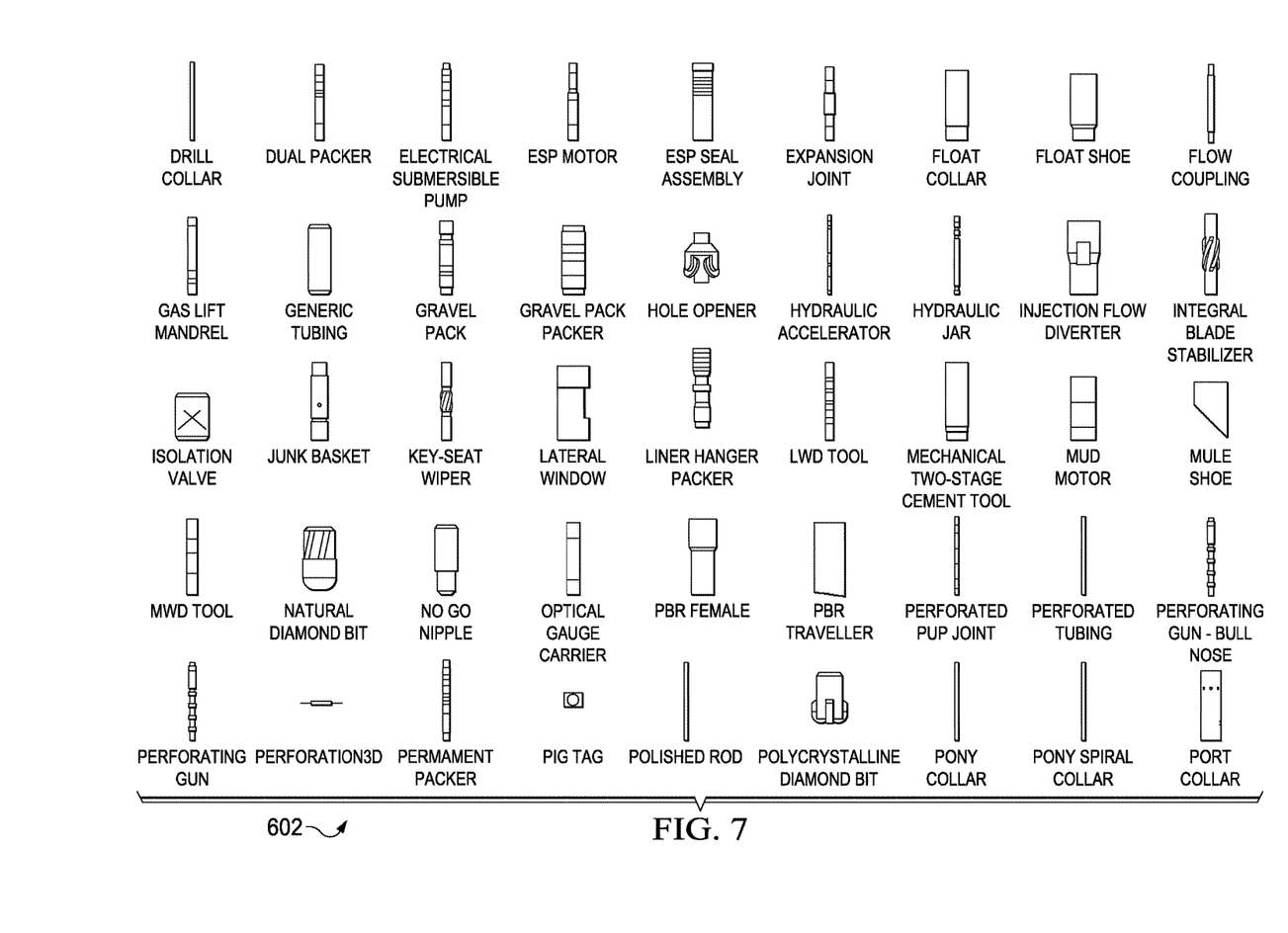
Figure 8:
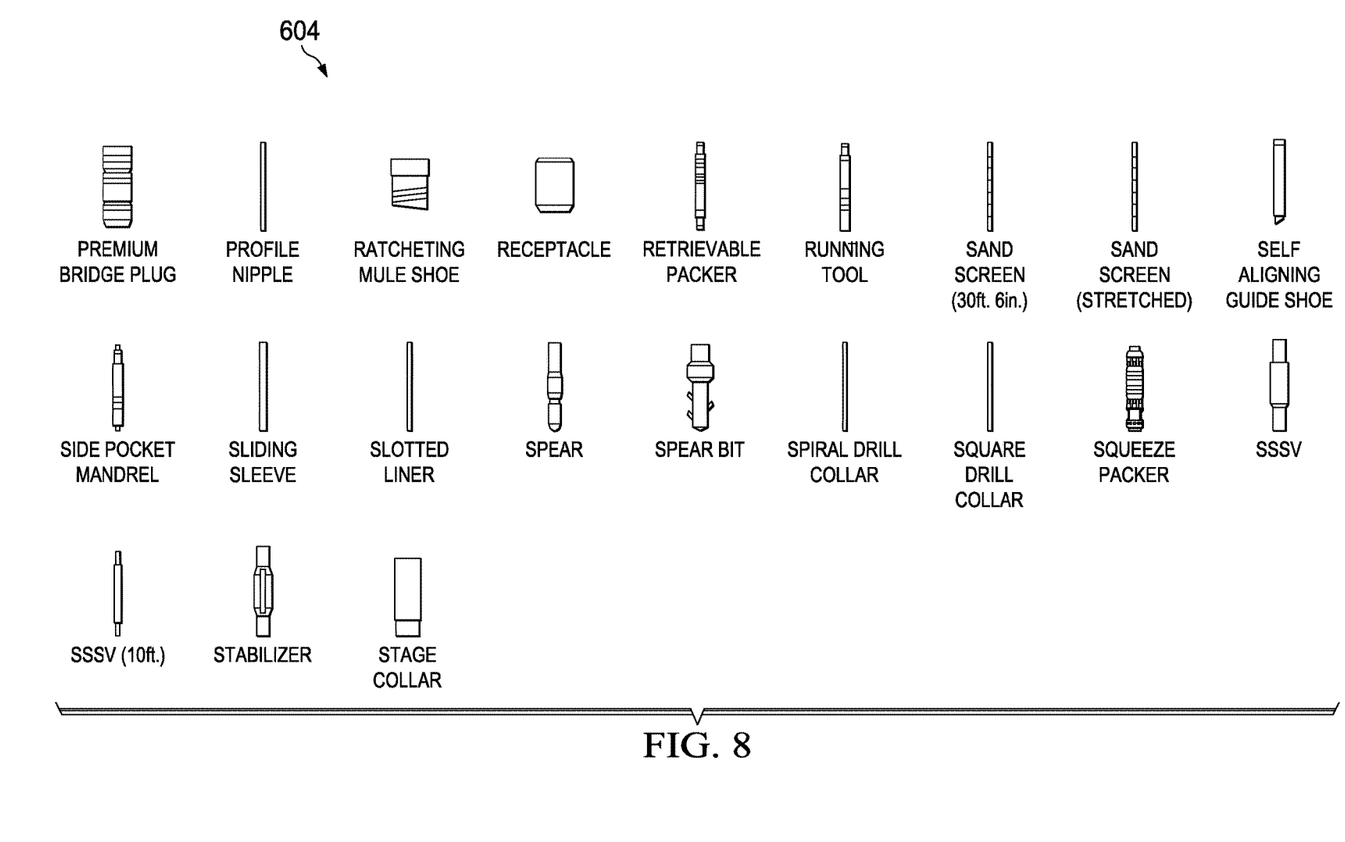

FIG. 6-8 are schematic, side view of wellbore components 600, 602 and 604 (together "600") in accordance with an illustrative embodiment. The wellbore components 600 provide a small sample of components that may be utilized to generate and render a three dimensional wellbore. For example, the wellbore components 600 may include a straddle packer, a stretchable packer, a sub, a sub with a stabilizer, a tieback seal, a tri-cone bit, tubing (30 ft.), tubing anchor catcher, tubing hanger, tubing pump, tubing single, washover bit, watermelon mill, wire wrap screen, wireline reentry guide, three point reamer, six point reamer, nine point reamer, adjustable bent housing, adjustable union, anchor seal assembly, annular barrier, bi-centered bit, blind pipe, bull nose, casing external packer, casing guide shoe, casing hanger, casing joint (40 ft), casing pup joint, check valve, chemical injection mandrel, circulation sub, coiled tubing, control line anchor, core bit, crossover, cuttings bed impeller, debris sub, diamond mill bit, disappointment plug, downhole sensor, drill collar, dual packer, electrical submersible pump, electrical submersible pump motor, electrical submersible pump seal assembly, expansion joint, float collar, flow coupling, gas lift mandrel, generic tubing, grave pack, gravel pack packer, hole opener, hydraulic accelerator, hydraulic jar, injection flow diverter, integral blade stabilizer, isolation valve, junk basket, key-seat wiper, lateral window, liner hanger, packer, logging while drilling tool, mechanical two-stage cement tool, mud motor, Mule shoe, measure while drilling tool, natural diamond bit, no go nipple, optical gauge carrier, polished bore receptacle female, polished bore receptacle traveler, perforated pup joint, perforated tubing, perforating gun, perforating gun bull nose, perforation, permanent packer pip tag, polished rod, polycrystalline diamond, pony collar, pony spiral collar, port collar, premium bridge plug, profile nipple, ratcheting mule shoe, receptacle, retrievable packer, running tool, sand screen (30 ft.), sand screen stretched, self-aligning guide, side pocket mandrel, sliding sleeve, slotted liner, spear, spear bit, spear drill collar, square drill collar, squeeze packer, sub surface safety valve, stabilizer, and stage collar.

Figure 9:
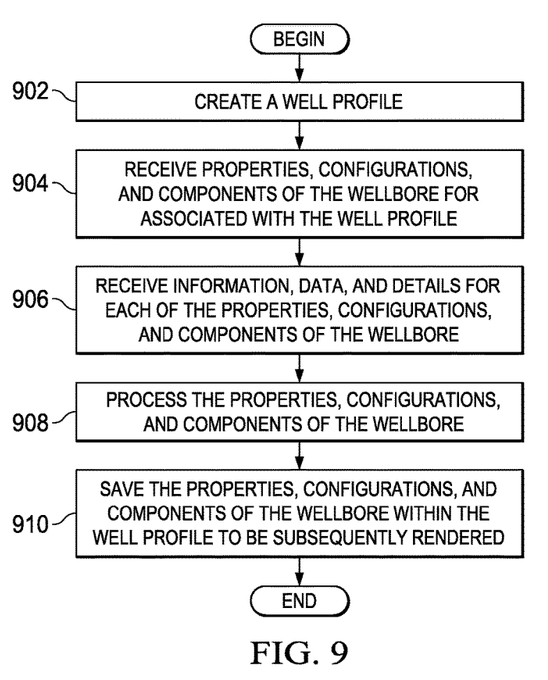
FIG. 9 is a flowchart of a process for creating a well profile with an illustrative embodiment.

FIG. 9 is a flowchart of a process for creating a well profile in accordance with an illustrative embodiment. The process of FIG. 9 may be implemented by a system utilized by a user. The process may be performed any time during the planning, generation, modification, or abandonment of a wellbore. In one embodiment, the process may begin with the system creating a well profile (step 902). The well profile may be created utilizing a template in response to a user selection. For example, the user may select to enter the well information. In one embodiment, the well profile may include a location, identifier, type, associated company or parties, preliminary analysis, design information, long-term plan, goals, financial information, geographical information, and so forth. The well profile may be utilized to enter or store information associated with a wellbore over a short or long time period. For example, the well profile associated with a wellbore may be updated over a number of years from planning to abandonment. The well profile may be created and modified by any number of users. As a result, the well profile is dynamically updated and may be very useful to any number of users or parties.

Next, the system receives properties, configurations, and components of the wellbore for association with the well profile (step 904). Each time the wellbore is updated (with the updates recorded), the system stores the new information associated with the well profile. The information entered during step 904 may be received from a user manually. In another embodiment, any number of automated systems including invoicing information, well logs, optical monitoring, RFID tags, audible indicators, or so forth may be utilized to automatically update the well profile. For example, the wellbore information may describe the past that the well follows and may be obtained by conducting a survey using special downhole equipment that is run in the borehole to take measurements.

In one embodiment, the properties may include the actual holes that exist including lengths and diameters. The configurations may include the case things that have been cemented into the hole (or holes) and their corresponding lengths and diameters. The components may include the drill string, completion string, or other type of string that may be currently inside the cemented casings and sections of the open borehole. For example, tubes of distinct sizes and shapes (as well as colors) may be utilized to represent the various holes and casings that make up the wellbore and rendered to follow the wellbore path.

Next, the system receives information, data, and details for each of the properties, configurations, and components of the wellbore (step 906). The information, data, and details may include exact information about the components or processes performed on the wellbore. For example, the data of step 906 may include exact measurements and positioning of a component, such as a stabilizer. In another example, the data may indicate that a casing with a first diameter is replacing a casing with a second diameter to keep the records associated with the well profile up-to-date. Any number of very specific information, details, measurements, positioning, location, and so forth may be entered in the well profile. In one embodiment, each component may be represented by one or more symbols (examples of which are shown herein).

Next, the system processes the properties, configurations, and components of the wellbore (step 908). The various information may be processed in anticipation of rendering or otherwise displaying a three dimensional representation of the wellbore. For example, the distinct properties, configurations, and components may be linked by data or algorithms so that when later access the information may be quickly retrieved. In one embodiment, during step 908, a three dimensional model of the wellbore is created for subsequent retrieval or modification. For example, for long sections of the wellbore, multiple copies of a symbol may be rendered to cover the distance (i.e. 5000 feet of drill pipe may require a number of 125×40' sections all following the wellbore path trajectory). Other components may be scaled to fit the requested length is read from one or more databases.

Next, the system saves the properties, configurations, and components of the wellbore within the well profile to be subsequently rendered (step 910). The information may be saved in one or more databases and secured to prevent unauthorized retrieval. In one embodiment, a username, well profile identification, password, encryption key, or other security information may be required to access the well profile. The information may be saved in a memory associated with the system or in a database accessible to the system.

Figure 10:
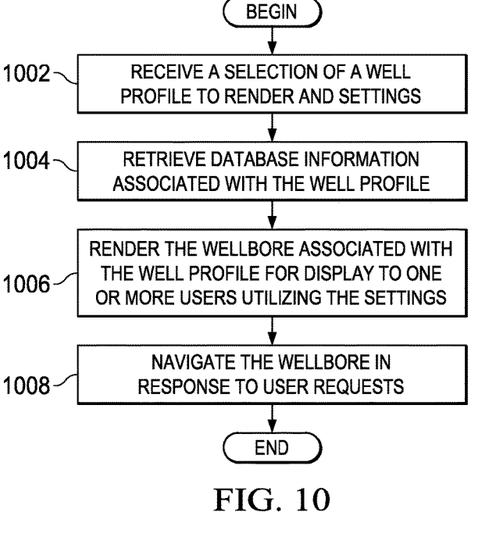
FIG. 10 is a flowchart of a process for viewing a wellbore associated with a well profile in accordance with an illustrative embodiment.

FIG. 10 is a flowchart of a process for viewing a wellbore associated with a well profile in accordance with an illustrative embodiment. The process may begin with the system receiving a selection of a well profile to render and settings (step 1002). In one embodiment, the well profile may be selected utilizing an associated name or identifier. In another embodiment, the well profile may be selected from a database entry or geographical display showing distinct wellbores by location. Any number of other data access methods may be utilized to retrieve the well profile from any number of wireless or physically connected computing or communications devices. For example, a site foreman may utilize a wirelessly enabled tablet to select a well profile to perform the process described in FIG. 10.

The settings or user preferences may indicate particular parameters, commands, or information for displaying a wellbore associated with a well profile. For example, a particular viewpoint may be selected. In another example, the user may select to only view casings of the wellbore or other specific components. The user may also be able to select specific color configurations, overlays, transparency, broken or hidden lines, planning information, engineering information, completion information, and so forth. The parameters, commands, and information may include, but are not limited to: display line type, display line thickness, well bore color, component and/or wellbore transparency, 3D cube view, 2D map view, position of 3D cube view, graphical view zoom level, component selection and/or well bore equipment types, profile component scale, component and/or wellbore custom graphics, component and/or wellbore overlays, component and/or wellbore transparency, and component and/or wellbore solid color.

Next, the system retrieves database information associated with the well profile (step 1004). The database information may include the properties, configurations, and components of the associated wellbore as previously described in FIG. 9. The information of step 1004 may be saved in any number of file formats, database entries, or so forth. For example, the well profile may be a series of interconnected or linked files that are retrieved by the system.

Next, the system renders the wellbore associated with the well profile for display to one or more users utilizing the settings (step 1006). In one embodiment, the wellbore is rendered for display on the system. In another embodiment, the wellbore is rendered for communication to one or more external devices that have selected the wellbore associated with the well profile. As a result, the rendered information may be formatted for any number of devices or software systems or specified systems. In one embodiment, the wellbore may be rendered to minimize bandwidth utilized to communicate the associated graphics and display. In one embodiment, the drill string or completion string may be located inside the wellbore and within the casing. In order to view the applicable string, the casing may be displayed as semi-transparent. In another embodiment, the user may select to turn on or off specific portions of the wellbore, such as the information or displayed data for the well hole, casing, or so forth, in order to view the wellbore more clearly and efficiently. In other embodiments, the system may apply a scaling factor to the diameters of the components to make it easier to see the string when viewing it from a great distance (e.g. components may be viewed as wider without affecting their length). One or more smart algorithms or plug-ins may be utilized to render the components based on the selected viewpoint.

Next, the system navigates the wellbore in response to user requests (step 1008). The system may allow the user to perform a fly through of the wellbore, pan, zoom, explode components, turn on and off transparencies, and otherwise view the wellbore and perform manipulations. The system may also display relevant information associated with the wellbore, such as component identifier, depth, measurements of the components, geographical features at specified depths, perforations performed, and other similar information.

The illustrative embodiments provide a system, method, and three dimensional wellbore visualization system. In one embodiment, a method is provided for displaying a wellbore. A well profile is generated in a computing system. The wellbore is associated with the well profile. Information associating the wellbore is received including at least components. The wellbores displayed in three dimensions for review by one or more users.

The well profile may also be accessible by one or more authorized users. The wellbore may be navigated utilizing a fly through in response to selection by a user. The well profile may be stored in a database and the wellbore may be displayable to a user through a network device. The information may include at least status, casings, and components of the wellbore. The wellbore may be modified in response to user input to modify the information. The well profile may be safe for access by the one or more users. The information may include subsurface data associated with the wellbore. The information may include a perforation status of the wellbore. The wellbore may be displayed utilizing one or more settings established by the user including at least coloring and transparency.

Another embodiment provides a system for displaying a three-dimensional wellbore. The system includes a server configured to generate a well profile, associate the wellbore with the well profile, receive information associated with the wellbore including at least components, and display the wellbore in three dimensions for review by one or more users. The system further includes one or more databases in communication with the server. The database is configured to store the information associated with the well profile and wellbore.

The server may generate the well profile for the wellbore automatically utilizing available data. The server may retrieve data from at least a geological database and an engineering database. The server may be accessible to a number of computing and communications devices through a network to display the wellbore in response to a request from the one or more users. The wellbore may be displayed utilizing one or more settings established by the user including at least coloring and transparency.

Yet another embodiment provides a network device including a processor for executing a set of instructions and a memory for storing the set of instructions. The set of instructions are executed to generate a well profile, associate the wellbore with the well profile, receive information associate with the wellbore include at least components, and display the wellbore in three dimensions for review by one or more users, wherein the wellbore is displayed utilizing settings established by the one or more users.

The information may include subsurface data associated with the wellbore. The information included including at least depth, manufacture, installing party, and installation date associated with each component of the wellbore. The wellbore may be displayed utilizing a fly through of the wellbore. The well profile may be accessible to a number of authorized users.

The previous detailed description is of a small number of embodiments for implementing the invention and is not intended to be limiting in scope. The following claims set forth a number of the embodiments of the invention disclosed with greater particularity.

What is claimed:

1. A method for displaying a three-dimensional (3D) wellbore visualization, the method comprising:
   generating, by a computing system, a well profile related to a design and operation of a wellbore within a subsurface earth formation;
   receiving information associated with the wellbore and one or more downhole components of a drill string or a completion string located inside the wellbore;
   updating the well profile with the information associated with the wellbore and the one or more downhole components; and
   rendering a 3D representation of the wellbore and the one or more downhole components on a display of the computing system for review by one or more users of the computing system, based on the updated well profile.

2. The method according to claim 1, wherein the well profile is accessible by one or more authorized users.

3. The method according to claim 1, further comprising: navigating the wellbore utilizing a fly-through in response to a selection by a user.

4. The method according to claim 1, wherein the well profile is stored in a database, and wherein the wellbore is displayable to a user through a network device.

5. The method according to claim 1, wherein the information includes a status of casings and one or more other downhole components of the wellbore.

6. The method according to claim 1, further comprising: modifying the wellbore in response to user input to modify the information.

7. The method according to claim 1, further comprising: saving the well profile for access by the one or more users.

8. The method according to claim 1, wherein the information includes subsurface data associated with the wellbore.

9. The method according to claim 1, wherein the information includes a perforation status of the wellbore.

10. The method according to claim 1, wherein the wellbore is displayed utilizing one or more settings established by the user including at least coloring and transparency.

11. A system for displaying a three dimensional (3D) wellbore visualization, the system comprising:
    a server configured to generate a well profile related to a design and operation of a wellbore within a subsurface earth formation, receive information associated with the wellbore and one or more downhole components of a drill string or a completion string located inside the wellbore, update the well profile with the information associated with the wellbore and the one or more downhole components, and provide, to a client device via a network, a 3D representation of the wellbore and the one or more downhole components for display to one or more users of the client device, based on the well profile; and
    one or more databases in communication with the server, the database configured to store the well profile and the information associated with the wellbore and the one or more downhole components.

12. The system according to claim 11, wherein the server generates the well profile for the wellbore automatically utilizing available data.

13. The system according to claim 11, wherein the server retrieves data from at least a geological database and an engineering database.

14. The system according to claim 11, wherein the server is accessible to a plurality of computing and communications device through a network to display the wellbore in response to a request from one of the one or more users.

15. The system according to claim 11, wherein the wellbore is displayed utilizing one or more settings established by the user including at least coloring and transparency.

16. A network device comprising:
    a processor for executing a set of instructions; and
    a memory for storing the set of instructions, wherein the set of instructions are configured to:

generate a well profile related to a design and operation of a wellbore within a subsurface earth formation;

receive information associated with the wellbore and one or more downhole components of a drill string or a completion string located inside the wellbore;

update the well profile with the information associated with the wellbore and the one or more downhole components; and render a 3D representation of the wellbore and the one or more downhole components on a display coupled to the network device for review by one or more users, wherein the 3D representation is displayed utilizing settings established by the one or more users.

17. The network device according to claim 16, wherein the information includes subsurface data associated with the wellbore.

18. The network device according to claim 16, wherein the information includes data including at least depth, manufacturer, installing party, and installation date associated with each component of the wellbore.

19. The network device according to claim 16, wherein the wellbore is displayed utilizing a fly through of the wellbore.

20. The network device according to claim 16, wherein the well profile is accessible to a plurality of authorized users.

* * * * *